(12) United States Patent
Kitamura

(10) Patent No.: US 10,882,144 B2
(45) Date of Patent: Jan. 5, 2021

(54) LASER SHIELDING DEVICE

(71) Applicant: HONDA MOTOR CO., LTD., Tokyo (JP)

(72) Inventor: Kenji Kitamura, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 16/029,715

(22) Filed: Jul. 9, 2018

(65) Prior Publication Data

US 2019/0015934 A1 Jan. 17, 2019

(30) Foreign Application Priority Data

Jul. 14, 2017 (JP) ................................ 2017-137766

(51) Int. Cl.
| | |
|---|---|
| *G02B 27/00* | (2006.01) |
| *B23K 26/70* | (2014.01) |
| *B23K 26/21* | (2014.01) |
| *G02B 5/00* | (2006.01) |
| *B23K 26/08* | (2014.01) |
| *B23K 26/03* | (2006.01) |
| *B23K 26/211* | (2014.01) |

(52) U.S. Cl.
CPC .......... *B23K 26/706* (2015.10); *B23K 26/032* (2013.01); *B23K 26/0869* (2013.01); *B23K 26/21* (2015.10); *B23K 26/211* (2015.10); *G02B 5/003* (2013.01)

(58) Field of Classification Search
CPC . G02B 5/00; G02B 5/003; G02B 5/22; G02B 5/26; G02B 27/00; G02B 27/0149; B23K 26/032; B23K 26/0869; B23K 26/21; B23K 26/211; B23K 26/38; B23K 26/706; H01L 21/67109; G01N 29/2418
See application file for complete search history.

(56) References Cited

U.S. PATENT DOCUMENTS

| | | | | |
|---|---|---|---|---|
| 4,575,610 | A * | 3/1986 | Gavin ....................... | F16P 1/06 219/121.6 |
| 6,107,597 | A * | 8/2000 | Staschewski ........ | B23K 26/702 219/121.63 |
| 6,518,586 | B1 * | 2/2003 | Heberer .................... | F16P 1/06 250/515.1 |
| 7,800,087 | B2 * | 9/2010 | Pieger ................... | B23K 26/28 250/517.1 |
| 2009/0078694 | A1 * | 3/2009 | Hayashi ............ | H01L 21/67109 219/444.1 |

(Continued)

FOREIGN PATENT DOCUMENTS

| | | |
|---|---|---|
| JP | 04-039587 | 4/1992 |
| JP | 2014-113627 | 6/2014 |

OTHER PUBLICATIONS

Japanese Office Action for Japanese Patent Application No. 2017-137766 dated Apr. 9, 2019.

*Primary Examiner* — Thong Q Nguyen
(74) *Attorney, Agent, or Firm* — Amin, Turocy & Watson, LLP

(57) ABSTRACT

A laser shielding device interposed between the camera and the reflected light and is provided with a plurality of plates juxtaposed at an interval. Of the plurality of plates, an incident-side plate disposed on an incident side of the reflected light may be made larger in heat capacity compared to other plates disposed on the camera side of the incident-side plate.

6 Claims, 4 Drawing Sheets

(56) References Cited

U.S. PATENT DOCUMENTS

2009/0090187 A1* 4/2009 Sano ................ G01N 29/2418
73/655
2017/0165788 A1* 6/2017 Maruyama ........... B23K 26/127

* cited by examiner

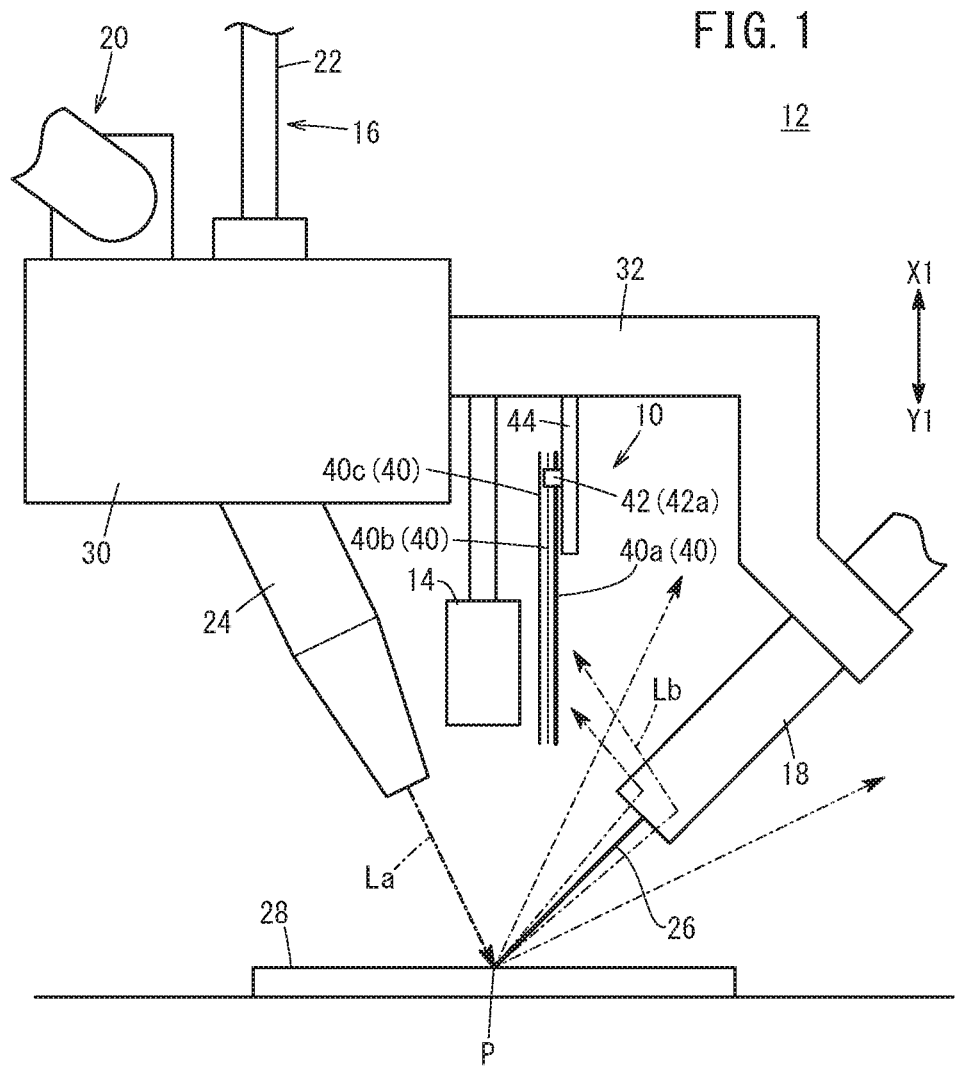

LASER SHIELDING DEVICE

CROSS-REFERENCE TO RELATED APPLICATION

This application is based upon and claims the benefit of priority from Japanese Patent Application No. 2017-137766 filed on Jul. 14, 2017, the contents of which are incorporated herein by reference.

BACKGROUND OF THE INVENTION

Field of the Invention

The present invention relates to a laser shielding device for shielding reflected laser light directed toward an object to be shielded from laser light in a laser processing machine.

Description of the Related Art

For example, as disclosed in Japanese Laid-Open Utility Model Publication No. 04-039587, there has been known a laser shielding device for shielding reflected light directed toward an object to be shielded in order to prevent the reflected light of laser light irradiated from a laser irradiation unit from reaching the object to increase the temperature of the object to be shielded. The known laser shielding device is equipped with a plate of metallic shielding plate interposed between the reflected light and the object to be shielded.

However, in the aforementioned laser shielding device, a radiation heat generated by the shielding plate heated by the reflected light is transferred to the object to be shielded. Therefore, it is difficult to sufficiently suppress an increase in temperature of the object. A cooling structure for cooling the shielding plate may be provided in order to suppress the radiation heat transfer, but makes the structure of the laser shielding device complicated. Further, if the shielding plate is disposed sufficiently away from the object to be shielded, the laser shielding device and the laser processing machine become large, lowering the degree of freedom in layout undesirably.

SUMMARY OF THE INVENTION

A main object of the present invention is to provide a laser shielding device capable of, with a simple and small configuration, effectively suppressing an increase in temperature of the object to be shielded in a laser processing machine.

According to one embodiment of the present invention, there is provided a laser shielding device for shielding reflected light directed toward an object to be shielded in a laser processing machine having a laser irradiation unit configured to irradiate laser light on a workpiece, and the object to be shielded disposed within a range which the reflected light of the laser light reaches, wherein the laser shielding device further comprises a plurality of plates interposed between the object to be shielded and the reflected light and juxtaposed at an interval.

In the laser shielding device, it is preferable that, of the plurality of plates, an incident-side plate disposed on an incident side of the reflected light is larger in heat capacity compared to other plates disposed on the object side of the incident-side plate. By making the incident-side plate larger in heat capacity compared to other plates, it is possible to make the incident-side plate hardly increase the temperature even if the reflected light enters the incident-side plate. As a result, because the energy of heat radiation from the incident-side plate can be made small, it is possible to enhance the effect of the plurality of plates for suppressing the temperature of the object to be shielded from rising.

In the laser shielding device, it is preferable that the incident-side plate is larger in volume compared to other plates. By making the volume of the incident-side plate large, in other words, by making the mass large, it is possible to increase the heat capacity easily.

In the laser shielding device, it is preferable that, of the plurality of plates, an intermediate plate disposed between an incident side of the reflected light and a side adjacent to the object to be shielded is larger in thermal resistance compared to other plates. By making the intermediate plate larger in thermal resistance, it is possible to suppress the conduction of heat to the plate on the object side even if the heat conduction occurs from a plate on the incident side of the reflected light to the intermediate plate through a connecting portion or the like between the plurality of plates. Consequently, it is possible to satisfactorily suppress the radiation heat transfer from the plates to the object to be shielded and to effectively prevent the temperature of the object to be shielded from rising.

In the laser shielding device, it is preferable that the intermediate plate is smaller in cross-sectional area perpendicular to an extending direction compared to other plates. By reducing the cross-sectional area of the intermediate plate in a direction perpendicular to the extending direction, it is possible to easily make thermal resistance large in the extending direction of the intermediate plate.

In the laser shielding device, there may be further provided a connecting portion extending in a juxtaposed direction of the plurality of plates and integrally connecting the plurality of plates. In this case, because the plurality of plates can be connected integrally by one connecting portion, it is possible to further simplify the configuration of the laser shielding device.

The above and other objects, features, and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 1 is a schematic view showing the configuration of a laser welding machine provided with a laser shielding device according to an embodiment of the present invention;

DESCRIPTION OF THE PREFERRED EMBODIMENTS

Figure 2A:
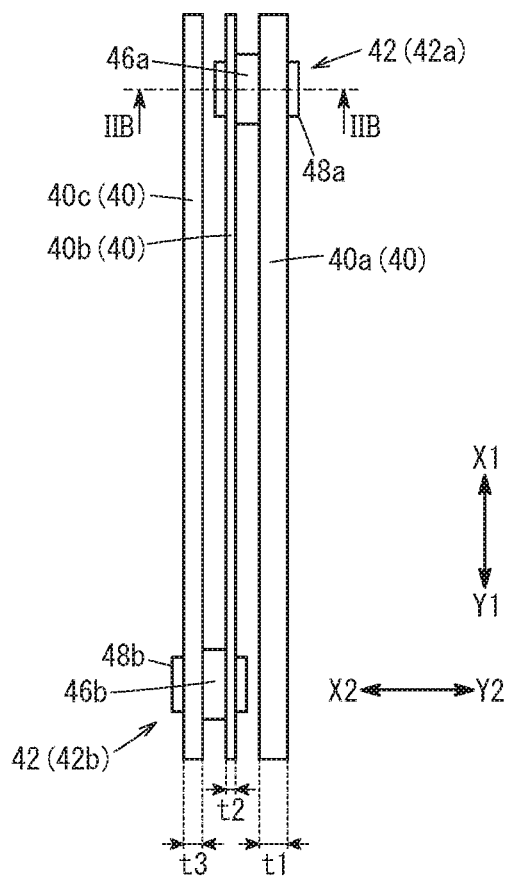
FIG. 2A is a side view of a main part of the laser shielding device shown in FIG. 1.

With reference to the accompanying drawings, a laser shielding device according to the present invention will be described in detail based on preferred embodiments.

In the laser shielding device, reflected light enters a plate disposed on the reflected light side of the plurality of plates interposed between the object to be shielded and the reflected light and is absorbed or reflected. Therefore, it is possible to prevent the reflected light from advancing toward the object to be shielded side beyond the plates, in other words, to shield the reflected light directed toward the object to be shielded. Further, even if the reflected light heats the plate on the reflected light side, it is possible to block the heat radiation directed from the heated plate toward the object to be shielded because the plurality of the plates are provided to be juxtaposed at an interval between the reflected light and the object to be shielded.

Further, the plurality of plates are juxtaposed at an interval and have air layers therebetween. With this configuration, it is possible to let the heat released from the plates, and it is possible to suppress the heat conduction in the juxtaposed direction of the plates by the air layers operating as insulation layers. Consequently, because in particular, the plate disposed on the object side can be satisfactorily prevented from rising in temperature, it is possible to further effectively suppress the radiation heat transfer from the plates to the object to be shielded.

As described above, according to the laser shielding device, a simple and small configuration is taken in which the plurality of plates are provided between the reflected light and the object to be shielded, as described above. Therefore, it is possible to effectively prevent the object in the laser processing machine from rising in temperature without losing the freedom in layout. As a result, because the cooling-off period of the object to be shielded can be shortened, it is possible to improve the processing efficiency in the laser processing machine.

In the laser shielding device, the plurality of plates may comprise at least three plates of plates, a plurality of connecting portions may be further provided to connect the adjacent plates, and in a juxtaposed direction of the plurality of plates, the plurality of connecting portions may be arranged alternately on one end side and the other end side in the extending direction of the plates. As mentioned above, air layers are interposed between the adjacent plates, so that the heat conduction takes place mainly through the connecting portions.

For example, in the case where a first plate, a second plate and a third plate are arranged side by side in this order and the connecting portions are arranged alternately as described above, the heat of the first plate is conducted to the second plate through the connecting portion provided on one end side in the extending direction. Then, after being conducted from the one end side to the other end side of the second plate, the heat is conducted to the third plate through the connecting portion. Because the entirety of the second plate is utilized as a heat conduction path in the extending direction, i.e., as a heat dissipation path, it is possible to suppress the temperature increase of the plate provided on the object side, making it possible to effectively suppress the temperature of the object to be shielded from rising.

Hereinafter, as shown in FIG. 1, a laser shielding device 10 according to the present embodiment is explained, for example, as a laser processing machine attached to a laser welding machine 12, and a camera 14 provided in the laser welding machine 12 is an object to be shielded. However, examples are not in particular limited to those described above. The laser shielding device 10 is also applicable to various laser processing machines similarly to the laser welding machine 12. Further, without being limited to the camera 14, it is possible to shield reflected light toward any objects disposed within a range reachable by the reflected light.

At first, the laser welding machine 12 will be described. The laser welding machine 12 is mainly equipped with a laser irradiation unit 16, a wire supply unit 18, the camera 14, and a moving mechanism 20. The laser irradiation unit 16 has a laser light source (not shown) and an irradiation head 24 connected to the laser light source through a transmission cable 22 and irradiates laser light La from the irradiation head 24 toward a welding position P on a workpiece 28.

The wire supply unit 18 feeds a welding wire 26 supplied from a wire reel unit (not shown) and guides the welding wire 26 to the welding position P. The camera 14 outputs image-capturing data captured at the welding position P, to a control unit (not shown) or the like. By the use of the image-capturing data, it is possible to perform the inspection of the welding quality or the like.

The moving mechanism 20 has an end portion, to which a support frame 30 is attached and the irradiation head 24 is supported on the support frame 30. Further, the wire supply unit 18 and the camera 14 are attached to an attachment member 32 extending from the support frame 30. Accordingly, it is possible for the moving mechanism 20 to move the irradiation head 24, the wire supply unit 18 and the camera 14 integrally by moving the support frame 30. With this configuration, it is possible to adjust the irradiation direction and position of the laser light La, the guiding position of the welding wire 26, the image capturing position of the camera 14 and the like.

The laser welding machine 12 as mentioned above is able to perform a welding operation by irradiating the laser light La toward the welding position P and supplying the welding wire 26 while operating the moving mechanism 20. At this time, as shown in FIG. 1, a part of the laser light La emitted from the irradiation head 24 reflects at the welding position P and becomes reflected light Lb. The reflected light Lb advances toward the camera 14 directly or by being further reflected by components of the laser welding machine 12 such as the wire supply unit 18 and the like.

When the camera 14 is heated above its heatproof temperature by irradiation of the reflected light Lb and the like, it becomes difficult for the camera 14 to take image of the welding position P, causing difficulties in welding by the laser welding machine 12. To prevent the camera 14 from being heated by the reflected light Lb, the laser shielding device 10 according to the present invention is provided in the laser welding machine 12.

Figure 2B:
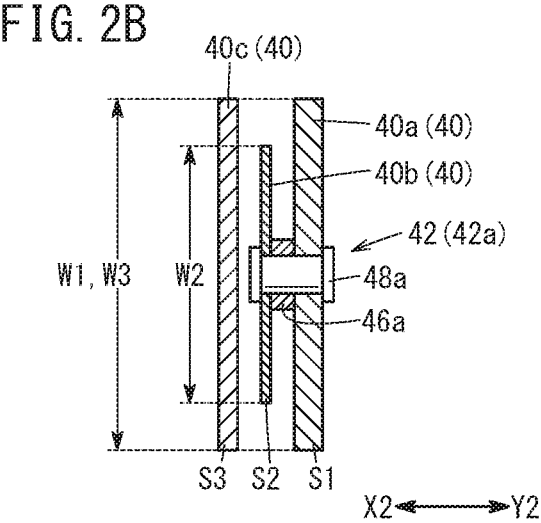
FIG. 2B is a sectional view taken along the arrow IIB-IIB in FIG. 2A.

As shown in FIGS. 1, 2A and 2B, the laser shielding device 10 is provided with a plurality of plates 40, a connecting portion 42 connecting the plates 40 to be juxtaposed at intervals, and a support portion 44 (see FIG. 1) supporting the plates 40 between the camera 14 and the reflected light Lb.

In the present embodiment, the plurality of plates 40 are composed of three plates in total an incident-side plate 40a, an intermediate plate 40b and a camera-side plate (i.e., an object-side plate) 40c, are arranged in this order from the side on which the reflected light Lb is incident toward the camera 14. Incidentally, the incident-side plate 40a, the intermediate plate 40b and the camera-side plate 40c are also referred to simply as the plates 40 unless distinguished in particular. The plurality of plates 40 are made of the same material such as metal.

The incident-side plate 40a is larger in volume than other plates 40 (i.e., the intermediate plate 40b and the camera-side plate 40c) arranged on the camera 14 side of the incident-side plate 40a. In the present embodiment, as shown in FIG. 2A, volumes are set as described above in such a way that the thickness t1 of the incident-side plate 40a is made larger compared to of the thickness t2 of the intermediate plate 40b and the thickness t3 of the camera-side plate 40c. The incident-side plate 40a being large in volume (mass) has a heat capacity larger than the intermediate plate 40b and the camera-side plate 40c, making the temperature increase less easily.

The intermediate plate 40b has its dimensions set to be larger in thermal resistance than the incident-side plate 40a and the camera-side plate 40c. In the present embodiment, as shown in FIG. 2A, the thickness t2 of the intermediate plate 40b is smaller compared to of the thickness t1 of the incident-side plate 40a and the thickness t3 of the camera-side plate 40c. Further, as shown in FIG. 2B, the width W2 of the intermediate plate 40b is the smallest among the width W1 of the incident-side plate 40a, the width W2 of the intermediate plate 40b and the width W3 of the camera-side plate 40c.

Accordingly, assuming that areas S1, S2 and S3 (see FIG. 2B) respectively represent the cross-sectional areas perpendicular to the extending direction (i.e., the arrows X1-Y1 direction in FIG. 2A) of the incident-side plate 40a, the intermediate plate 40b and the camera-side plate 40c, the cross-sectional area S2 of the intermediate plate 40b is smaller compared to other cross-sectional areas S1, S3. By setting the dimensions in this manner to increase the thermal resistance of the intermediate plate 40b, it is possible to make the heat conduction difficult particularly in the extending direction of the intermediate plate 40b.

The thickness t3 of the camera-side plate 40c is smaller than the thickness t1 of the incident-side plate 40a and is larger than the thickness t2 of the intermediate plate 40b. The width W3 of the camera-side plate 40c is substantially the same size as the width W1 of the incident-side plate 40a and is larger than the width W2 of the intermediate plate 40b. Incidentally, as shown in FIG. 2A, the incident-side plate 40a, the intermediate plate 40b and the camera-side plate 40c are substantially the same as each other in length in the extending direction. The length in the extending direction of these plates 40 is set to a dimension that is capable of blocking the incidence of the reflected light Lb to the camera 14, and allowing the camera 14 to capture images.

In the present embodiment, connecting portions 42 include a first connecting portion 42a connecting the incident-side plate 40a and the intermediate plate 40b on one end side in the extending direction (i.e., the arrow X1 direction side in FIG. 2A) and a second connecting portion 42b connecting the intermediate plate 40b and the camera-side plate 40c on the other end side in the extending direction (i.e., the arrow Y1 direction side in FIG. 2A). The second connecting portion 42b is omitted from FIG. 1. That is, as shown in FIG. 2A, the first connecting portion 42a and the second connecting portion 42b are each provided to extend in the juxtaposed direction (i.e., the arrow X2-Y2 direction in FIG. 2A) of the plurality of plates 40 alternately on one end side and the other end side in the extending direction of the plates 40.

The first connecting portion 42a and the second connecting portion 42b respectively have spacers 46a, 46b and also respectively have connecting pins 48a, 48b. The spacer 46a of the first connecting portion 42a is interposed between the incident-side plate 40a and the intermediate plate 40b to maintain a predetermined interval therebetween. The connecting pin 48a of the first connecting portion 42a pierces through and integrally connects, in the thickness direction (juxtaposed direction), the incident-side plate 40a and the intermediate plate 40b which are juxtaposed with the spacer 46a therebetween, on one end side in the extending direction of the intermediate plate 40b and the camera-side plate 40c.

The spacer 46b of the second connecting portion 42b is interposed between the intermediate plate 40b and the camera-side plate 40c to maintain a predetermined interval therebetween. The connecting pin 48b of the second connecting portion 42b pierces through and integrally connects, in the thickness direction (juxtaposed direction), the intermediate plate 40b and the camera-side plate 40c which are juxtaposed with the spacer 46b therebetween on the other end side in the extending direction.

The intervals between the incident-side plate 40a, the intermediate plate 40b and the camera-side plate 40c depending on the thicknesses of the spacers 46a, 46b may be any dimension as long as respective plates 40 are out of contact with each other, and form heat insulating layers of air therebetween.

As shown in FIG. 1, for example, the support portion 44 is fixed to the attachment member 32 of the laser welding machine 12 on one end side in the extending direction and is fixed to the incident-side plate 40a through the first connecting portion 42a on the other end side. Thus, in the plurality of plates 40 arranged between the camera 14 and the reflected light Lb, the camera-side plate 40c faces the camera 14, and the reflected light Lb enters the incident-side plate 40a.

The laser shielding device 10 according to the present embodiment is configured as described above. Next, the operation and effects of the laser shielding device 10 will be described.

First of all, when the reflected light Lb is generated to advance toward the camera 14 in the welding operation of the laser welding machine 12, the reflected light Lb is absorbed or reflected by the incident-side plate 40a. For this reason, it is possible to prevent (block) the reflected light Lb from advancing toward the camera 14 beyond the incident-side plate 40a.

Because of the large heat capacity as described above, the temperature of the incident-side plate 40a does not rise even if the reflected light Lb enters, making it possible to decrease the energy of heat radiation. Further, by the intermediate plate 40b and the camera-side plate 40c arranged between the incident-side plate 40a and the camera 14, it is possible to block (insulate) a radiation heat transfer from the incident-side plate 40a toward the camera 14.

Furthermore, the plurality of plates 40 are juxtaposed with each other with intervals therebetween, and air layers are formed between the respective plates 40. Thus, it is possible to let the heat released from the plates 40, while suppressing heat conduction (insulating) in the juxtaposed direction from the incident-side plate 40a toward the intermediate plate 40b and the camera-side plate 40c, by the air layers having high insulation properties. Accordingly, because the intermediate plate 40b and the camera-side plate 40c are prevented from rising in temperature, it is also possible to suppress the radiation heat transfer from the intermediate plate 40b and the camera-side plate 40c toward the camera 14.

As described above, according to the laser shielding device 10, with a simple and small-size configuration of the plurality of plates 40 provided between the reflected light Lb and the camera 14, as described above, it is possible to effectively prevent the camera 14 in the laser welding machine 12 from rising in temperature, without losing the freedom in layout. As a result, since the cooling-off period of the camera 14 can be shortened, it is possible to improve the welding efficiency in the laser welding machine 12.

Further, in the laser shielding device 10, the first connecting portion 42a connecting the incident-side plate 40a and the intermediate plate 40b, and the second connecting portion 42b connecting the intermediate plate 40b and the camera-side plate 40c are arranged alternately on the one end side and the other end side in the extending direction of the plates 40. As mentioned before, since an air layer is interposed between the adjoining plates 40, the heat conduction between the plates 40 takes place mainly through the connecting portion 42. Accordingly, the heat of the incident-side plate 40a heated by the reflected light Lb is conducted to the intermediate plate 40b through the first connecting portion 42a provided on the one end side in the extending direction. Then, after being conducted from the one end side to the other end side in the extending direction of the intermediate plate 40b, the heat is conducted to the camera-side plate 40c through the second connecting portion 42b.

In this way, respective entireties in the extending direction of the plurality of plates 40 can be utilized as a heat conduction path, in other words, as a radiation path, it is possible to effectively suppress an increase in temperature of the camera-side plate 40c. In this heat conduction path, the thermal resistance of the intermediate plate 40b is increased as described above to make the heat conduction in the extending direction difficult. Also with this arrangement, the heat from the incident-side plate 40a is hardly conducted to the camera-side plate 40c, it is possible to suppress an increase in temperature of the camera-side plate 40c. Consequently, it is possible to suppress the radiation heat transfer from the camera-side plate 40c and hence, to suppress the temperature rising of the camera 14 more effectively.

Furthermore, in the laser shielding device 10, as described above, the plurality of plates 40 are made of the same material as one another. With this configuration, the structure of the laser shielding device 10 is further simplified to realize a reduction in cost and the like.

The present invention is not limited particularly to the aforementioned embodiment and can be modified variously without departing from the gist of the invention.

Figure 3A:
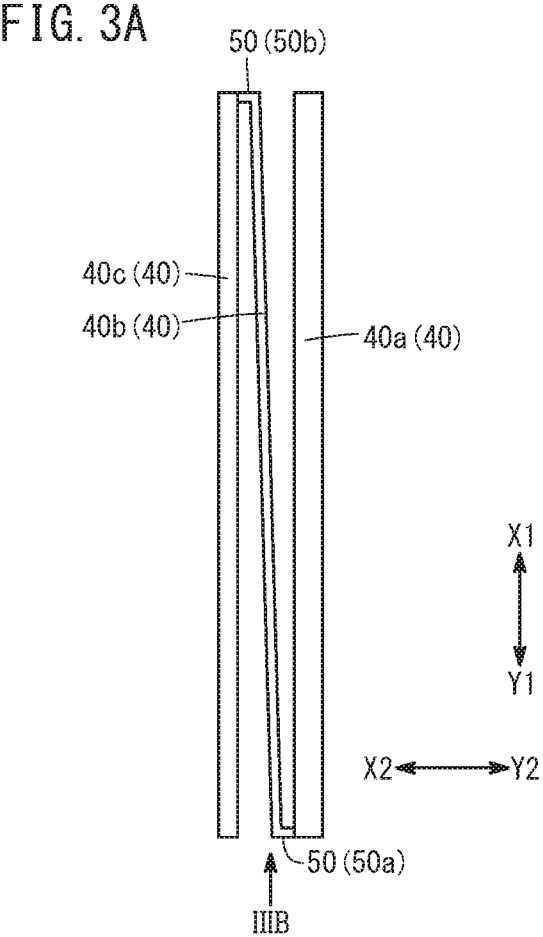
FIG. 3A is a side view of a main part for explaining connecting portions in a modification of the device shown in FIG. 2A.
Figure 3B:
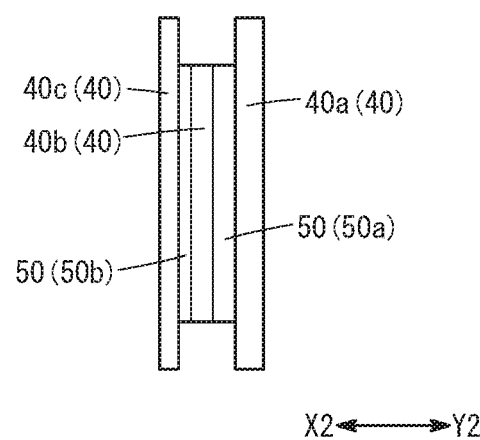
FIG. 3B is a view of the modification taken along the arrow IIIB in FIG. 3A.
Figure 4A:
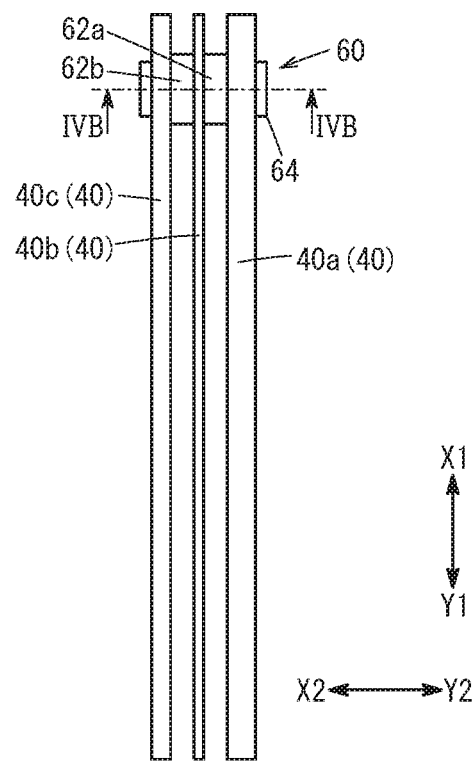
FIG. 4A is a side view of a main part for explaining a connecting portion in another modification of the device shown in FIG. 2A.
Figure 4B:
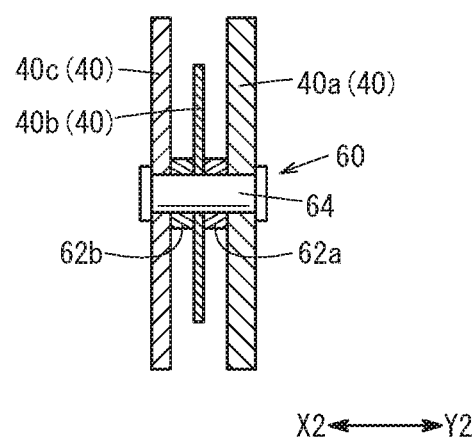
FIG. 4B is a sectional view taken along the arrow IVB-IVB in FIG. 4A.

For example, in place of the foregoing connecting portions 42, the laser shielding device 10 may be equipped with connecting portions 50 according to a modification shown in FIGS. 3A and 3B or a connecting portion 60 according to another modification shown in FIGS. 4A and 4B. Incidentally, among the components shown in FIGS. 3A to 4B, those identical with or similar to the components shown in FIGS. 1, 2A and 2B in function and effect are given the same reference numeral and will be omitted from being described in detail.

First of all, as shown in FIGS. 3A and 3B, the connecting portions 50 are composed of a first connecting portion 50a and a second connecting portion 50b. The first connecting portion 50a connects the incident-side plate 40a by welding to the other end (the arrow Y1 direction in FIG. 3A) in the extending direction of the intermediate plate 40b. The second connecting portion 50b connects the intermediate plate 40b by welding to the one end (the arrow X1 direction in FIG. 3A) in the extending direction of the camera-side plate 40c. That is, the connecting portions 50 are welded portions between the plates 40.

Even with the connecting portions 50 like this, the laser shielding device 10 can perform the same operation and effects as with the case of the device with the aforementioned connecting portions 42. Moreover, with the connecting portions 50 as the welded portions, it is possible to decrease the number of components and to realize space saving.

Next, as shown in FIGS. 4A and 4B, the connecting portion 60 integrally connects the incident-side plate 40a, the intermediate plate 40b and the camera-side plate 40c with spacers 62a, 62b and a connecting pin 64. The spacer 62a is interposed between the incident-side plate 40a and the intermediate plate 40b and defines a predetermined interval therebetween. The spacer 62b is interposed between the intermediate plate 40b and the camera-side plate 40c and defines a predetermined interval therebetween.

The connecting pin 64 pierces in the thickness direction through the incident-side plate 40a, the intermediate plate 40b and the camera-side plate 40c with the spacers 62a, 62b interposed as described above, on one end side (the arrow X1 direction in FIG. 4A) in the extending direction and integrally connects these plates 40. Incidentally, in place of the configuration composed of the spacers 62a, 62b and the connecting pin 64, the connecting portion 60 may be a welded portion (not shown) integrally connecting the plurality of plates 40 on the one end side in the extending direction.

Even with the connecting portion 60 like this, the laser shielding device 10 can perform the same operation and effects as with the case of the device with the aforementioned connecting portions 42. Moreover, because all of the plates 40 are integrally connected by one connecting portion 60, it is possible to reduce the number of components and to simplify the process of attaching the connecting portion 60.

The connecting portions 42, 50, 60 are not limited to the configurations exemplified above and may be those capable of connecting the plurality of plates 40 juxtaposed at predetermined intervals.

In the aforementioned embodiment, the plurality of plates 40 are composed of three plates 40 in total including the incident-side plate 40a, the intermediate plate 40b and the camera-side plate 40c. However, the present invention is not limited particularly to the aforementioned configuration. The plurality of plates 40 may include two plates, four plates or more. Even if the plurality of plates 40 are composed of any number of plates, the plate 40a which the reflected light Lb enters is made largest in heat capacity among the plates 40, so that the aforementioned operation and effects can be performed.

Although in the aforementioned embodiments, the plurality of plates 40 are made of the same material as one another, the plurality of plates 40 may be made of materials different from one another. In this case, by selecting as the material for the incident-side plate 40a, the one with a specific heat larger than ones for other plates 40, it is possible to easily increase the heat capacity of the incident-side plate 40a. Similarly, by selecting as the material for the intermediate plate 40b, the one with a thermal resistance larger than the ones for other plate 40, it is possible to easily increase the thermal resistance of the intermediate plate 40b.

In the aforementioned embodiment, the incident-side plate 40a is made larger in heat capacity compared to other plates 40, and at the same time, the intermediate plate 40b is made larger in thermal resistance compared to other plates 40. However, the present invention is not limited particularly to this configuration. The plurality of plates 40 may have substantially the same heat capacity as one another or may be configured to become substantially the same thermal resistance as one another. Further, the incident-side plate 40a may have a larger heat capacity compared to other plates 40, and all the plurality of plates 40 may have substantially the same thermal resistance. The intermediate plate 40b may have a larger thermal resistance compared to other plates 40, and all the plurality of plates 40 may have substantially the same heat capacity.

What is claimed is:

1. A laser shielding device for shielding reflected light directed toward an object to be shielded in a laser processing machine having a laser irradiation unit configured to irradiate laser light on a workpiece, and the object to be shielded disposed within a range which the reflected light of the laser light reaches, the laser shielding device comprising:
   a plurality of plates interposed between the object to be shielded and the reflected light and juxtaposed to one another at an interval;
   wherein of the plurality of plates, an intermediate plate disposed between an incident-side plate disposed on an incident side of the reflected light and an object-side plate disposed adjacent to the object to be shielded is larger in thermal resistance compared to each of a rest of the plurality of plates.

2. The laser shielding device according to claim 1, wherein:
   of the plurality of plates, the incident-side plate disposed on the incident side of the reflected light is larger in heat capacity compared to each of the rest of the plurality of plates disposed on the object to be shielded side of the incident-side plate.

3. The laser shielding device according to claim 2, wherein:
   the incident-side plate is larger in volume compared to the each of the rest of the plurality of plates.

4. The laser shielding device according to claim 1, wherein:
   the intermediate plate is smaller in cross-sectional area compared to the each of the rest of the plurality of plates in a direction perpendicular to an extending direction of the plates.

5. The laser shielding device according to claim 1, wherein:
   the plurality of plates comprise at least three plates;
   a plurality of connecting portions connect the plates adjacent to each other; and
   in a juxtaposed direction of the plurality of plates, the plurality of connecting portions are arranged alternately on one end side and another end side in an extending direction of the plates.

6. The laser shielding device according to claim 1, further comprising:
   a connecting portion extending in a juxtaposed direction of the plurality of plates and integrally connecting the plurality of plates.

* * * * *